United States Patent [19]

Leis

[11] 4,063,721
[45] Dec. 20, 1977

[54] METHOD FOR THE SEPARATION OF SEGREGATIONS AND IMPURITIES FROM MATERIAL MIXTURES BY CENTRIFUGING AND EQUIPMENT FOR THE EXECUTION OF THE METHOD

[75] Inventor: Hans Leis, Ottobrunn, Germany

[73] Assignee: Messerschmitt-Bölkow-Blohm Gesellschaft mit beschrankter Haftung, Munich, Germany

[21] Appl. No.: 721,366

[22] Filed: Sept. 8, 1976

[30] Foreign Application Priority Data

Sept. 18, 1975 Germany ............................ 2541602
July 8, 1976 Germany ............................ 2630674
Aug. 17, 1976 Germany ............................ 2636948

[51] Int. Cl.² .............................................. C22B 9/02
[52] U.S. Cl. .................................... 266/204; 266/207; 233/11
[58] Field of Search ................... 233/11; 266/204, 207

[56] References Cited

U.S. PATENT DOCUMENTS

| 3,174,341 | 3/1965 | Sudo et al. | 233/11 |
| 3,347,453 | 10/1967 | Goergen | 233/11 |

Primary Examiner—Gerald A. Dost
Attorney, Agent, or Firm—Toren, McGeady and Stanger

[57] ABSTRACT

A method for the separation of segregations from material mixtures is disclosed. The method is particularly suited for the sedimentation of high-melting metal alloys and their impurities. In the method, material mixtures are introduced into the heatable rotor of a centrifuge disposed in a cooled vacuum. The rotor is subjected stepwise to the influence of changing gravitational accelerations as well as to a heat shock treatment varying in temperature level and/or duration. Equipment for execution of the method is also disclosed. The rotor of the centrifuge consists of several layers and includes a basic part whose outer surface is braced by a compound material bandage. The inner surface of the rotor is provided with a heat-deflecting, protective coating. A non-rotating cooling means and a central heat source are accommodated inside the rotor.

21 Claims, 2 Drawing Figures

METHOD FOR THE SEPARATION OF SEGREGATIONS AND IMPURITIES FROM MATERIAL MIXTURES BY CENTRIFUGING AND EQUIPMENT FOR THE EXECUTION OF THE METHOD

FIELD OF INVENTION

The invention relates to a method for the separation of segregations from material mixtures by centrifuging, in particular, for the sedimentation of high-melting metals and metal alloys and their impurities, and to equipment for the execution of this method.

BACKGROUND OF THE INVENTION

While the sedimentation of solutions or the like by centrifuging at low or normal temperatures meets with no difficulties whatever and has been known for a long time in mechanical chemistry, problems will occur when centrifuging is to be performed under the simultaneous influence of high temperatures. If high temperatures are required, the usual materials used in the centrifuge industry for the centrifuge rotor, such as aluminum or titanium alloys, often prove insufficient. Their disadvantage lies in the reduced strength which occurs with increasing temperature and, in addition, the chemical reactivity of these materials with the material mixtures to be separated increases as a rule with increasing temperature.

Due to the drop in strength caused by the action of the heat, the rotors, particularly of ultra-centrifuges, can no longer withstand the stresses occurring at accelerations of, say, more than $200,000 \times g$. Such and higher accelerations are required, however, to achieve satisfactory separation power or diffusion effect by centrifuging where molten systems are involved.

It has already been suggested to laminate a rotor and to construct it of layers of different materials (DT-OS 2,453,650); liquid plastics, for example, being cast into the rotating jacket consisting of a mechanically stronger layer, around which wire is possibly wound in addition. Besides increasing corrosion resistance and decreasing weight, this is intended to provide simple and low-cost production. But a rotor of this type is unsuited for a heated ultra-centrifuge because, among other factors, it can be subjected to only moderate thermal stresses without deforming due to plastification of its inner layers.

It is an object of the invention to provide a method by which the sedimentation, particularly also of high-melting metals and metal alloys, is possible by centrifuging the material mixtures.

It is also an object of the present invention to solve the problem of providing the sedimentation of particles proper to the metal, as well as the problem of the separation of impurities.

It is further an object of the present invention to provide a heatable rotor for ultra-centrifuges, permitting, at justifiable technical expense, an increase of the melting temperature up to 2000° C and more in continuous operation.

SUMMARY OF THE INVENTION

In accordance with the present invention, a method for the separation of segregations from material mixtures by centrifuging, in particular for the sedimentation of high-melting metals and metal alloys an their impurities, comprises the steps of disposing a centrifuge having a heatable rotor in a cooled vacuum, introducing material mixtures for centrifuging into the rotor and subjecting the material stepwise to changing gravitational accelerations and to heat stock treatment varying at least one condition of temperature level and duration.

Also, in accordance with the present invention, a rotor for use with a centrifuge for the separation of segregations from material mixtures, in particular for the sedimentation of high-melting metals and metal alloys and their impurities, the rotor comprising a shpae-defining solid portion, the outer surfaces of the solid portion being braced by a compound material bandage, the inner surface of the rotor being provided with a heat-deflecting, protective coating, means for heating the rotor are disposed in the center thereof as well as means for cooling the rotor from the inside.

Finally, in accordance with the invention, apparatus for use in combination with the above rotor includes an evacuated housing, means for cooling the housing wherein the rotor is disposed within the housing.

For a better understanding of the present invention, reference is made to the following description and accompanying drawings while the scope of the invention will be pointed out in the appended claims.

DETAILED DESCRIPTION OF THE PREFERRED EMBODIMENTS

Figure 1:
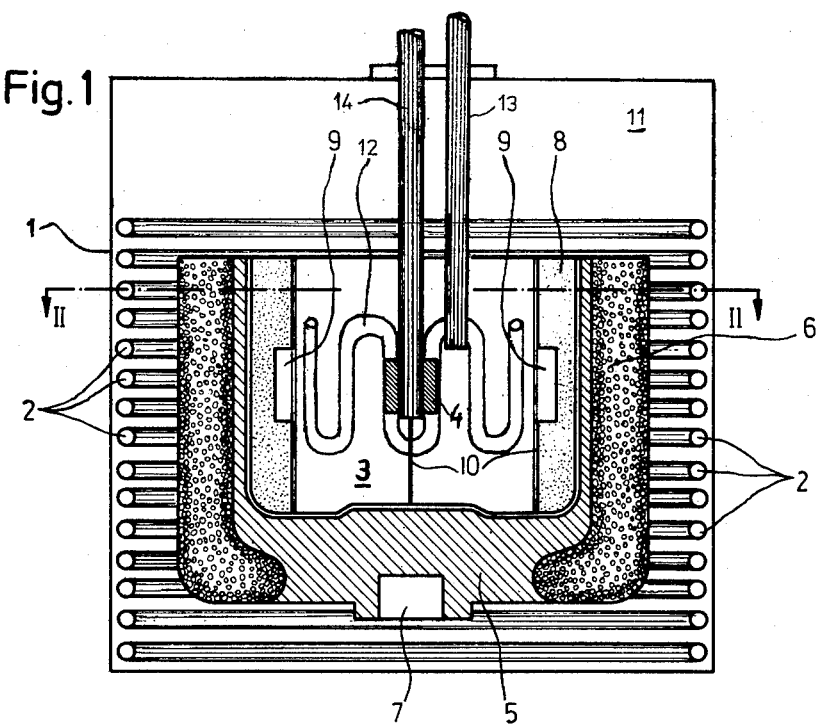
FIG. 1 is a schematic view of an ultra-centrifuge for the execution of the method according to the invention, shown in a side section.
Figure 2:
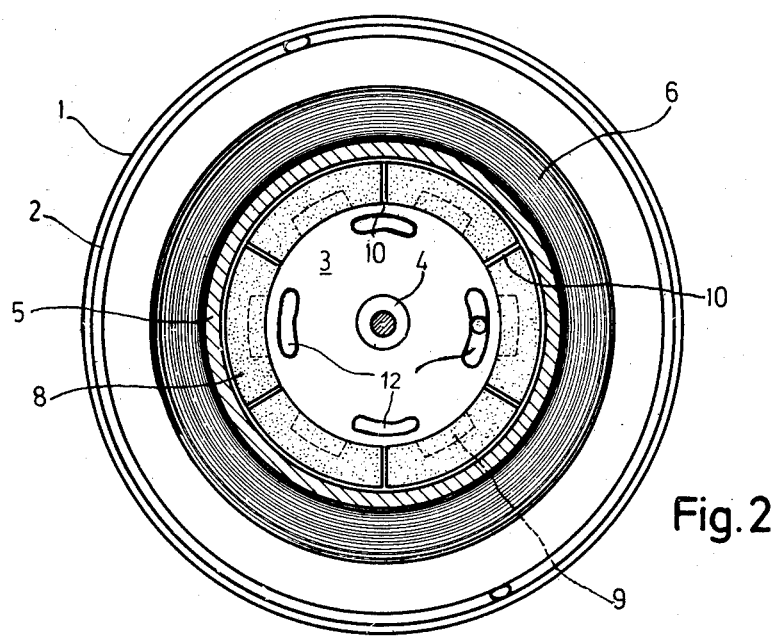
FIG. 2 is a cross section along line II—II of FIG. 1.

The ultra-centrifuge for the execution of the method according to the invention, schematically shown in FIGS. 1 and 2, consists of an evacuated housing 1, in whose interior are arranged a coil of tubes 2 through which a coolant flows and a rotor 3. The rotor 3 consists of a bowl-shaped, metallic, basic rotor part 5, around which a bandage 6 of fiber-reinforced compound material is wound. The concentration if fibers in the compound material of bandage 6 may be greatest opposite the intensely heated areas of the basic rotor part 5 which are also subjected to strong centrifugal forces. The greatest concentration of reinforcing fibers is opposite projecting areas of the basic rotor part. Provided in the bottom surface of the basic, metallic rotor part 5 is a cutout 7 to receive a drive unit (not shown).

Inside rotor 3 a cooling means 12 and a central heat source 4 are accommodated which are secured by mountings 13 and 14 to housing 1. The cooling means 12 and the heat source 4 can be withdrawn individually as well as jointly by means of mountings 13 and 14 from the interior of the rotor 3 to an upper part 11 of housing 1; this can be effected in the course of rotor operation, too. Either compressed air or a suitable cooling liquid, e.g., liquid nitrogen, may be employed to circulate as a coolant in the coil of tubes 2 and the cooling means 12.

The inner surface of the basic rotor part 5 is lined with a heat-deflecting, insulating, protective coating 8 such as cermets, ceramics or the like. It may have a metal coating. In the radiation area of the heat source 4 are formed, on the heat-deflecting, protective coating 8, reaction chambers 9 to receive and retain the material to be separated.

As may be seen in FIG. 2, the protective coating 8, divided into individual segments, is disposed on the inside rotor wall so as to be secure against breakage due to tensions occurring during the centrifuging operation. The joints between the segments are filled with an insolating material 10, such as asbestos or the like.

In the event that on sedimentation the material to be separeted occurs in liquid or solid form, the gas-tight basic rotor part 5 within the area of the outside wall can be dispensed with, so that the protective coating 8 rests directly against bandage 6. The basic rotor part 5 is then merely required in the central portion of the bottom surface in order to absorb the torque. In the case of extremely high accelerations, the outside walls of the preferably metallic basic rotor part 5 are stressed beyond the yield point, so that for this reason, too, its reduction to the central bottom surface portion is advantageous.

The method, in accordance with the invention, effects a clean separation of material mixtures while obtaining a sharp profile, the duration of the centrifuge treatment depending largely on the molecular structure of the material to be separated. It also makes it possible to separate, in addition to the particles proper to the alloy, impurities contained atomically, molecularly or in the form of molecular associations in the host lattice and therefore often hard to recognize and settle out. Within certain limits, this can be influenced by the selection of the centrifuge speed as well as by suitable temperature selection.

These limits, which depend among other factors on the decrease in strength of the rotor material under the influence of heat and high gravitational acceleration, can be influenced advantageously if a centrifuge arrangement is used, such as proposed in further development of the invention for the execution of the method characterized above: this involves an ultracentrifuge disposed in a cooled, evacuated housing, the rotor of which consists of a shape-giving, preferably metallic basic part whose outer surface is braced by a bandage of compound material, whose inner surface is provided with a heat-deflecting protective coating, and in whose center a heat source is disposed.

What the rotor according to the invention achieves is that even when its interior is heated to high temperatures, there is provided, despite the drop of strength in the structure of the basic part, as effective support which is brought about by the bandage tightly enclosing the rotor and which allows increasing the temperature to the point where the material to be separated melts.

The rotor 3, according to the invention, is thus characterized by its basic rotor part which consists of high-strength metal and is bowl-shaped. The structure strength of this preferred material, which starts dropping only under high thermal stresses, is additionally protected against deformation by means of the bandage 6 which may consist of a fiber-reinforced compound material produced by the winding method, according to a further development of the invention. The basic rotor part is further protected from excessive thermal stresses by the heat-deflecting coating 8 of its inner surface. As stated above, it may be lined with a metal layer reflecting the heat radiation. To this is added the arrangement of the rotor in a cooled vacuum, whereby temperature equilibrium between rotor inside and rotor outside is established.

To further expand on the concentration of reinforcing fibers in the compound material of the bandage, it may, for example, increase towards the outer edge areas of the rotor. If the outside surface of the rotor deviates from the straight cylindrical form and is, say spherically crowned, it may also be the greatest in the area of the largest diameter. This effectively protects the primarily endangered areas of the basic metallic rotor part against deformation.

It may be of further advantage to incorporate the endless reinforcing filaments of the bandage, for which, in addition to glass, boron or carbon fibers, metallic reinforcing threads are also suited, into an extremely heat-resistant matrix.

In the course of the separation of segregations or impurities on subjection to extraordinarily high and long-lasting exposure to the heat source 4 inside the rotor 3, there is a danger that the fiber-reinforced compound material bandages 6 of the rotor cannot withstand this thermal stress. Since the heat flow from inside the rotor passes through the rotor wall to the coil of tubes, which serves the purpose of cooling and is located in the evacuated housing 1, said heat flow becoming stabilized at a certain temparature level, cooling the rotor wall can only become effective if this stabilizing temperature remains below the softening temperature of the plastic matrix in the bandage. If this temperature is exceeded, however, continuous overheating of the matrix and destruction of the rotor are possible. In order to prevent this effectively, the supplementary, non-rotating cooling means 12 is installed inside the rotor 3.

This cooling means 12 and the heat source 4 located in the middle of the rotor 3 can be put into operation alternately and can be withdrawn even whilst the rotor is revolving into the housing portion 11 above the rotor.

After heating up and sedimentation of the material to be separated, the central heat source 4 can be put out of operation immediately, perhaps also withdrawn, and the supplementary cooling means 12 installed inside the rotor 3 put into operation simultaneously. This provides for protracted cooling of the rotor wall, preventing the plastic matrix of bandage 6 from softening. The outer coil of tubes 2 through which coolant has passed can naturally remain in operation in order to eliminate the greater part of the amount of heat occurring. Tests have demonstrated that, on using this arrangement and a heat-resistant matrix, sedimentaion can be applied to high-melting materials too, such as metals and metal alloys which may exhibit melting points between 2000° C and 3000° C.

In one preferred embodiment of the rotor, as also mentioned above, there may be provided in the interior of the rotor, preferably in the heat-deflecting and insulating protective coating 8, the reaction chambers 9 to receive and retain the material to be separated. The protective coating ist expediently manufactured of a chemically inactive material insensitive to temperature shocks, such as cermets, ceramics with or without metal coating, or the like and may at the same time serve as substrate. Moreover, the inner lining, divided into individual segments, may be disposed eithin on the inner wall of the basic rotor part or, if the basic rotor part comprises merely the bottom surface, may rest against the inner wall of bandage 6. The joints between the protective coating segments inside the rotor may be filled with a ductile insulating material 10 such as asbestos cement or the like. Such an arrangement assures against breakage of the inner lining due to tensions caused by shocklike heating during the centrifuging operation.

While the invention has been particularly shown and described with reference to the preferred embodiments thereof, it will be understood by those skilled in the art that various modifications and changes in form and detail may be made therein without departing from the true spirit and scope of the present invention.

What is claimed is:

1. A rotor for use with a centrifuge for the separation of segregations from material mixtures, in particular for the sedimentation of high melting metals and metal alloys and their impurities, said rotor comprising:
    a shape-defining basic part, the outer surface of said basic part being braced by a compound material bandage,
    a heat-deflecting, protective coating on the inner surface of said rotor;
    means for heating said rotor being disposed in the center thereof; and
    means for cooling said rotor being disposed in the inside thereof.

2. A rotor according to claim 1 wherein the basic rotor part consists of a bowl-shaped body having a cylindrical wall located between the bandage and the protective coating.

3. A rotor according to claim 2 wherein the concentration of fibers in the compound material differs over at least one of the values of height and thickness of the bandage in accordance with the operating stress of the shape-defining basic part of the rotor.

4. A rotor according to claim 2 wherein the bandage is composed of endless reinforcing threads incorporated by the winding process in a heat resistant matrix.

5. A rotor according to claim 1 wherein the basic rotor part comprises merely the bottom surface portion of the rotor.

6. A rotor according to claim 5 wherein the protective coating rests directly against the bandage.

7. A rotor according to claim 1 wherein the compound material of the bandage of said rotor is constructed with the use of reinforcing fibers.

8. A rotor according to claim 1 wherein the shape-defining basic part is metal.

9. A rotor according to claim 1 wherein the heat-deflecting protective coating of the rotor is provided with reaction chambers to receive and retain the material to be separated.

10. A rotor according to claim 9 wherein the surface of the reaction chambers are provided at least in part with a coating such as metal.

11. A rotor according to claim 1 wherein the surface of the heat-deflecting coating is provided at least in part with a coating such as metal.

12. A rotor according to claim 1 wherein the protective coating of the rotor is composed of sections having joints therebetween and that the joints between the sections are filled with an insulation material.

13. A rotor according to claim 1 wherein the insulating material is asbestos cement.

14. A rotor according to claim 1 wherein the cooling means and the heat source located in the middle of the rotor can be put into operation alternately.

15. A rotor according to claim 1 wherein the inside cooling means and the heat source are provided with mountings.

16. A rotor according to claim 15 wherein by means of the mountings the cooling means and the heat source can be removed upward from the stationary as well as the revolving rotor.

17. Apparatus for use in combination with the rotor of claim 1 including:
    an evacuated housing, and means for cooling said housing, said rotor being disposed within said housing.

18. The apparatus of claim 17 wherein said means for cooling said housing comprise a coiled tubular arrangement, said rotor being disposed within said arrangement and wherein a coolant circulates within the tubular portion.

19. Apparatus for the separation of segregations from material mixtures by centrifuging, in particular for the sedimentation of high melting metals and metal alloys and their impurities, comprising:
    an evacuated housing;
    a cooling element for said housing composed of a coiled tubular arrangement;
    a rotor disposed within said cooling element in said housing having a U-shaped cross-section, said rotor having a basic part, said rotor having a annular wall with internal and external surfaces, said rotor having a multi-layered material bandage disposed around said outer surface, said inner surface being provided with a heat-deflecting, protective coating, said coating being provided with reaction chambers to receive and retain material to be separated, said rotor also having means for cooling being disposed in the inside thereof and a heating source being disposed in the center thereof.

20. Apparatus according to claim 19, including high-melting metals and alloys contained in the reaction chambers, which metals and alloys are, step-by-step, exposed to the influence of a rising number of rotor revolutions.

21. Apparatus according to claim 19, wherein said source of heat in the centrifuge acts upon the high-melting metals and alloys at different temperature levels and for different durations.

* * * * *